United States Patent [19]

Verde

[11] 4,076,616

[45] Feb. 28, 1978

[54] PROCESS FOR THE BIOLOGICAL PURIFICATION OF SEWAGE

[76] Inventor: Luigi Verde, via S. Maria Mazzarello, 30/9, Turin, Italy

[21] Appl. No.: 695,297

[22] Filed: Jun. 11, 1976

[30] Foreign Application Priority Data

Jun. 12, 1975 Italy .................................. 68517/75

[51] Int. Cl.$^2$ .............................................. C02C 1/02
[52] U.S. Cl. ......................................... 210/17; 210/7; 210/198 R
[58] Field of Search ................. 210/7, 15, 17, 32, 274, 210/150, 198, 40, 207

[56] References Cited

U.S. PATENT DOCUMENTS

| | | | |
|---|---|---|---|
| 3,765,535 | 10/1973 | Anderson et al. | 210/274 |
| 3,803,029 | 4/1974 | Blechavczyk | 210/17 |
| 3,853,752 | 12/1974 | Tymoszczuk | 210/17 |

Primary Examiner—Frank A. Spear, Jr.
Assistant Examiner—E. Rollins Gross
Attorney, Agent, or Firm—Sughrue, Rothwell, Mion, Zinn and Macpeak

[57] ABSTRACT

In a biological water purification process dirty water such as sewage percolates through a submerged bed of activated carbon under aerobic conditions, the carbon particle size and the water flow rate being such that the time of contact of the water with the mass of carbon above an intermediate level of the bed is at least thirty minutes, oxygenation air being blown into the bed at this intermediate level so that the mass of carbon below this level remains substantially free of active colonies of bacteria. The bed can be reactivated as desired by flushing with clean water and then with dirty water to reestablish bacterial colonies.

6 Claims, 2 Drawing Figures

PROCESS FOR THE BIOLOGICAL PURIFICATION OF SEWAGE

BACKGROUND OF THE INVENTION

The present invention relates to the biological purification of sewage.

Known methods of biological purification of sewage almost exclusively use the active sludges system, a purification system which is time-consuming and expensive. Waste water other than sewer water, mainly industrial waste water, have in certain cases proved to be capable of purification in a more or less satisfactory manner by means of percolation in aerobic conditions through a bed of activated carbon in the pores of which colonies of bacteria are established which are capable of metabolizing or degrading the impurities contained in the water to be purified. Fundamentally this process is based on the adsorption of the impurities by the activated carbon and on the subsequent degradation of the adsorbed substances.

British Patent Specification No. 1,296,233 refers to the possibility of obtaining in this manner reductions of the chemical oxygen demand (C.O.D.) by more than 90%, with a flow of dirty water through an activated carbon bed of 12 gallon/min/foot$^2$ (corresponding to 300 liters/hour/dm$^2$), that is, with effective linear velocities of 30m/hour through the bed. When applying this type of process to urban sewage it has not hitherto been possible to obtain acceptable results, even when using three or more purification beds or columns in series. A certain improvement has been achieved using beds consisting of a mixture of activated carbon granules and activated sludges and continuously introducing a current of activated sludges into the flow of dirty water to be purified. With such processes, however, the whole purification plant inevitably becomes much more complicated, since it is necessary to provide a large settling tank for the recovery of the effluent sludges, as well as suitable equipment for the regeneration and recycling of such sludges.

In such known process, oxygenation air is blown into the carbon bed from below, or the dirty water is alternatively aerated immediately before its passage through the bed.

SUMMARY OF THE INVENTION

The present invention provides a process for biological purification of sewage by percolation through a submerged fixed bed of activated carbon under aerobic conditions, wherein:

(a) the particle size of the bed of activated carbon is between 1.5 and 8mm;

(b) oxygenation air is blown into the carbon bed at an intermediate level, in order to oxygenate directly only the mass of carbon disposed above the said intermediate level;

(c) the linear velocity of the water through the bed does not exceed 2 m/hour;

(d) the water remains in contact with the mass of carbon above the intermediate level for a time of contact of at least 30 minutes;

(e) the said intermediate level is such that, under the said operating conditions, a lower layer of the mass of carbon below the said intermediate level is substantially free of active colonies of bacteria.

If required, further air can be blown into the carbon bed at one or more levels situated above the said intermediate level.

In the present specification the "time of contact" is defined as the ratio of half the volume of the mass of activated carbon disposed above the intermediate level to the hourly flow of water to be purified. In fact, to a close approximation, it can be assumed that the volume occupied by the water in the said mass is substantially equal to half the volume of the said mass.

It will be understood from the above mentioned definition that the process according to the invention leaves completely out of consideration the adsorbing activity of the activated carbon. The pores of the carbon are important in that they provide ample areas for the bacterial colonization, which reaches its maximum density above the above-mentioned intermediate level. With the aforesaid granulometry and linear velocity the colonies of bacteria form a kind of connecting tissue between the individual carbon granules or particles, which contributes substantially to the purification. The efficiency and very existence of the connecting tissue would be adversely affected by linear flow velocities exceeding 2 m/hour. This connecting tissue serves, furthermore, to retain the particles dispersed in the water to be purified, which would otherwise escape the action of the bacteria.

The formation of the bacterial colonies does not present any difficulty. When commencing with a fresh change of activated carbon it is sufficient to circulate through the bed the water to be purified, in closed or open cycle, while simultaneously blowing in air, until the effluent is substantially clear, that is to say, free of colloidal turbidity indicating that the bacterial colonies have been formed. This preparatory stage lasts for some hours, at most 12 hours.

In the lower layer of the mass of activated carbon bed below the intermediate level at which the air is blown in, the resulting bacterial population decreases progressively in the downward direction, with a relatively steep gradient. The reason for this is firstly because of a lack of nutrient in the descending flow of water, and secondly because of insufficient oxygen dissolved in the said water flow. The mass of activated carbon in this lower layer, therefore, functions in the manner of a bacterial depletion column, and simultaneously as a filter. In particular, the bacterial colonies, carried down in the form of flakes or micro-flakes from the mass of the bed disposed above the intermediate level, are held by the mass disposed below the said level and mineralized by the diffused oxygen carried by the water.

After one week of operation, the carbon bed must be cleaned. For this purpose, it is sufficient to wash the bed with an ascending flow of purified water, preferably, at a flow rate typically corresponding to a linear velocity of 30m/hour or more, such as will mix up the entire bed. In this manner all the slush, now almost completely mineralized and innocuous, is carried away, after which the bacterial colonies are formed afresh in the manner already mentioned.

Preferably, the size of the carbon particles is from 3 to 5 mm. Also, the linear percolation velocity is preferably between 0.5 and 1 meter/hour, and the time of contact is preferably 40 to 70 minutes.

Typically, the process according to the invention can be carried out with a carbon bed in which the part of the bed located above the intermediate level at which the air is blown in has a height of between 1 and 1.5 meters, and in which the lower layer located below the said level has a height of at least 10 cm., preferably 15-20 cm. Heights of the lower layer in excess of 20 cm., although possible, would not produce any marked improvement. In practical terms, in order to purify a flow of 1 m³/hour of sewer water, 1-1.5 m³ of activated carbon are required, with the result that the chemical oxygen demand (C.O.D.) is reduced by over 90% and the biological oxygen demand (B.O.D.) is reduced by over 95%

BRIEF DESCRIPTION OF THE DRAWINGS

An apparatus for carrying out a process in accordance with one embodiment of the invention will now be described, by way of example, with reference to the appended drawings, wherein.

DETAILED DESCRIPTION OF THE ILLUSTRATED EMBODIMENT

Figure 1:
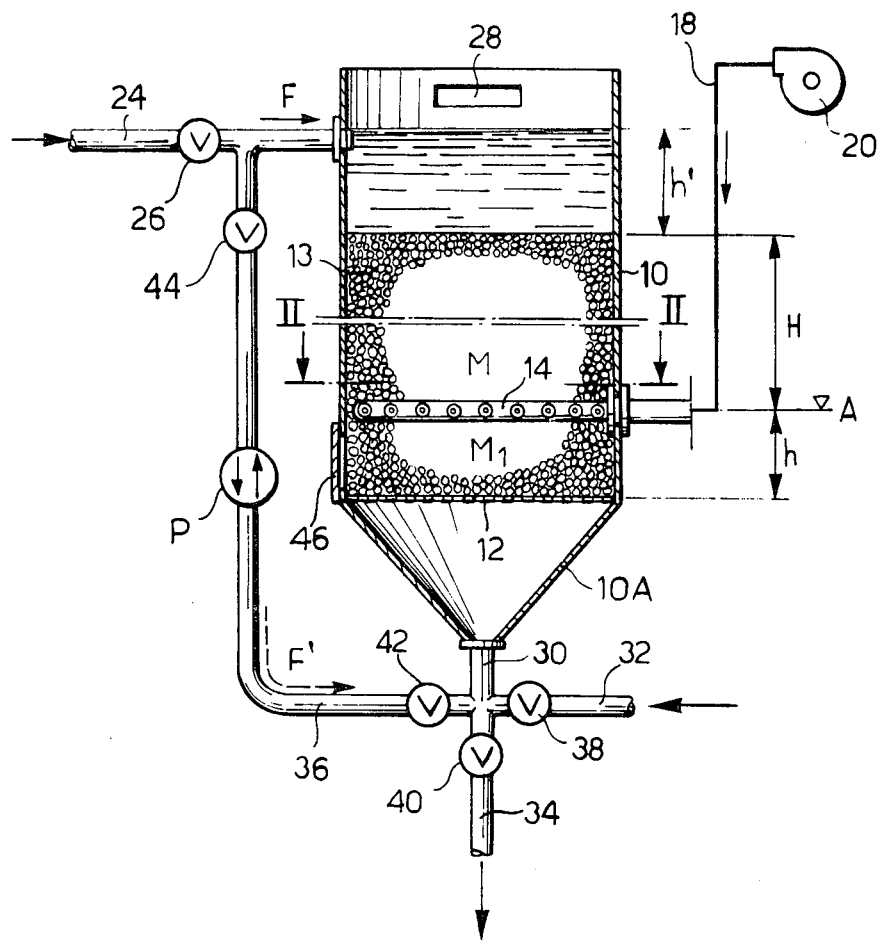
FIG. 1 illustrates a vertical section of the apparatus.
Figure 2:
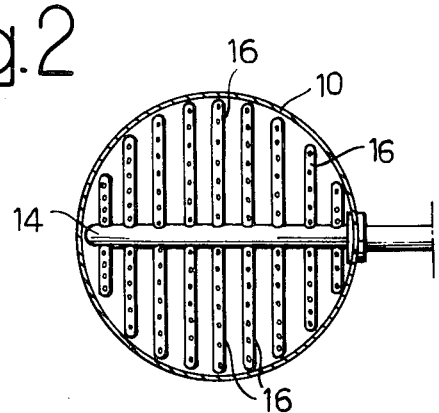
FIG. 2 is a transverse cross section along the line II—II of FIG. 1.

In the drawings, reference numeral 10 indicates a vertical cylindrical container having a height of 1.9 meters and an internal diameter of 0.6 m, open at the top and terminating at its lower end in a frusto-conical bottom 10A. Inside the container 10, between the bottom 10A and the cylindrical part, there is located a horizontal perforated plate 12 which supports a fixed bed 13 consisting of 370 liters of activated carbon granules having a mesh size of 6 to 4.

At an intermediate level A, situated at a height of 20 cm. above the plate 12, the container 10 is traversed diametrically by an air inlet pipe 14 from which a number of tubes 16 with perforated walls branch horizontally, the tubes 16 being immersed in the bed 13. The pipe 14 is connected through a line 18 to a compressor 20. The mass of carbon M above the level A has a height H of about 1.1 meters and a volume of about 0.310 m³, the volume of the mass of carbon $M_1$ below the level A being of about 0.060 m³.

A dirty water feed pipe 24 leads into the upper part of the container 10, the inlet flow of dirty water being controlled by a valve 26 in such a manner that, in operation, the surface of the dirty water in the container 10 is disposed at a height $h'$ of about 40cm. above the upper surface of the bed 13. Above the normal water level the container 10 is provided with an overflow opening 28.

Descending from the bottom 10A of the container 10 is an outlet pipe 30 which branches into three pipes 32, 34, 36 each provided with a respective flow regulating valve 38, 40, 42. The pipe 36 is connected to the feed pipe 24 at a point located between the valve 26 and the container 10, the flow of water through the pipe 36 being controlled by a valve 44 in the pipe 36. Between the valves 44 and 42 there is interposed in the pipe 36 a reversible circulation pump P of variable flow rate.

Immediately above the perforated plate 12 the container 10 has a lateral opening, closed fluid-tightly by a cover 46, through which the mass of carbon granules constituting the bed 13 can be discharged.

OPERATION

The process according to the invention is carried out as follows, using the illustrated apparatus with the container 10 fully charged with activated carbon.

The valves 38 and 40 are initially closed, the container 10 is filled with dirty water through the pipe 24, the valve 26 is closed and the pump P is then started, with the valves 42 and 44 open. The resulting circulation of dirty water is controlled by the pump P in such a manner as to produce in the bed 13 a descending flow of dirty water (arrow F) at a flow rate of less than 2 m/hour, preferably lower than 1 m/hour. The compressor 20 is started and its delivery is so controlled that the air flow through the bed 13, resulting in the appearance of air bubbles on the surface of the liquid in the container 10, does not alter the degree of compaction of the carbon bed 13. These conditions are maintained until the recirculating water becomes free of colloidal cloudiness, indicating that aerobic bacterial colonies have been formed.

At this stage the bed 13 is biologically active. The pump P is then stopped, the valves 42, 44 are closed and the valves 40 and 26 are re-opened and so controlled as to establish in the container a through flow of dirty water of about 0.250 m³/hour. The transverse section of the container is 0.282 m², and one half of the volume of the mass M of activated carbon is approximately 0.155 m³, so that the resulting linear velocity of percolation is 0.9 m/hour and the resulting time of contact of the liquid with the carbon bed is approximately 37 minutes. Purified water is discharged continuously through the pipe 34.

The purifying effect of a typical process according to the invention is illustrated in the following table:

| Pollutant Concentration | Dirty Water | Purified Water | reduction |
|---|---|---|---|
| C.O.D. (mg/l) | 330 | 26 | 92% |
| B.O.D. (mg/l) | 220 | 7 | 97% |
| $NH_3$ (mg/l) | 40 | 12 | 70% |
| Nitrites (mg/l) | 0.6 | 0.06 | 90% |
| Cloudiness ($SiO_2$mg/l) | 70 | 5 | 93% |
| Suspended substances (Imhoff cone) cc. | 3 | non-recordable | |

When the pressure loss through the bed becomes considerable, reaching, for example, 70cm of water column, steps are taken to restore efficiency. To achieve this, the feed valve 26 and the discharge valve 40 are closed, the flow of air from the compressor 20 is increased for a few minutes, and the compressor 20 then stopped. The valve 38 is opened and an ascending flow of purified water is led into the container 10 through the pipe 32, with a flow rate (for example, 10 m³/hour) such as to fluidize the bed 13. Sludges are consequently separated from the bed and discharged with the flow of water which pours through the overflow opening 28 into a discharge duct (not shown). Once a first discharge of the sludges has been effected in this manner, the valve 38 is preferably closed, the circulation valves 42, 44 re-opened and the pump P is set to operate in the reverse direction (arrow F') and at maximum speed, in order to keep the bed 13 in a bubbling state for some ten minutes, after which a final rinsing is effected by opening the valve 38 to admit purified water the cloudy liquid being discharged through the overflow opening 28. The bed 13 can then be re-activated by means of a circulation of the dirty water, in a closed or open cycle, in the manner already described.

I claim:

1. A process for the biological purification of sewage by percolation through a submerged fixed bed of activated carbon under aerobic conditions, wherein:

(a) the particle size of the bed of activated carbon is between 1.5 and 8mm;

(b) oxygenation air is blown into the carbon bed at an intermediate level, in order to oxygenate directly only the mass of carbon disposed above the said intermediate level;

(c) the linear velocity of the water through the bed does not exceed 2 m/hour;

(d) the water remains in contact with the mass of carbon above the intermediate level for a time of contact of at least 30 minutes;

(e) the said intermediate level is such that, under the said operating conditions, a lower layer of the mass of carbon below the said intermediate level is substantially free of active colonies of bacteria.

2. The process defined in claim 1, in which the granulometric size of the activated carbon is between 6 and 4 mesh.

3. The process defined in claim 1, in which the linear velocity of water through the bed is between 0.5 and 1 m/hour and the said time of contact of the water with the mass of carbon above the intermediate level is between forty and seventy minutes.

4. The process defined in claim 1, in which, after depletion of the bed in use, the bed is re-activated by means of an ascending flow of clean water.

5. The process defined in claim 4, in which the ascending flow of clean water is sufficient to mix up the bed.

6. The process defined in claim 4, in which, after the washing with clean water, water to be purified is made to percolate through the bed until the effluent from the bed is substantially free of turbidity.

* * * * *